(12) United States Patent
Lakic et al.

(10) Patent No.: US 9,399,508 B2
(45) Date of Patent: Jul. 26, 2016

(54) AIRCRAFT WING-TO-FUSELAGE JOINT WITH ACTIVE SUSPENSION AND METHOD

(71) Applicant: The Boeing Company, Seal Beach, CA (US)

(72) Inventors: Branko Lakic, Kirkland, WA (US); Jonathan B Vance, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 204 days.

(21) Appl. No.: 14/049,995

(22) Filed: Oct. 9, 2013

(65) Prior Publication Data

US 2015/0097076 A1 Apr. 9, 2015

(51) Int. Cl.
*B64C 1/26* (2006.01)
*B64C 3/38* (2006.01)

(52) U.S. Cl.
CPC .... *B64C 1/26* (2013.01); *B64C 3/38* (2013.01)

(58) Field of Classification Search
CPC .................................... B64C 3/38; B64C 3/32
USPC ........................................................... 244/46
See application file for complete search history.

(56) References Cited

U.S. PATENT DOCUMENTS

| | | | | |
|---|---|---|---|---|
| 4,343,447 A | * | 8/1982 | Reed, III | 244/137.4 |
| 4,502,652 A | * | 3/1985 | Breitbach | 244/99.13 |
| 4,616,793 A | * | 10/1986 | Hassler, Jr. | 244/137.4 |
| 4,742,975 A | * | 5/1988 | Pachomoff et al. | 244/54 |
| 4,776,537 A | * | 10/1988 | Garside | B64D 37/04 244/130 |
| 5,762,295 A | | 6/1998 | McGuire et al. | |
| 6,196,514 B1 | | 3/2001 | Kienholz | |

FOREIGN PATENT DOCUMENTS

| | | | |
|---|---|---|---|
| DE | 483040 | 9/1929 | |
| FR | 421352 | 2/1911 | |
| FR | 752680 | 9/1933 | |
| FR | 2915173 | 10/2008 | |
| FR | 2935351 | * 3/2010 | B64C 17/00 |

OTHER PUBLICATIONS

European Patent Office; Extended European Search Report for Application No. 14187327.3 dated Feb. 18, 2015.

* cited by examiner

*Primary Examiner* — Justin Benedik
(74) *Attorney, Agent, or Firm* — Parsons Behle & Latimer

(57) ABSTRACT

An aircraft includes a fuselage, a wing, and a decoupled joint interconnecting the fuselage and the wing. The decoupled joint can be an active suspension system. A method of adapting an aircraft to attenuate forces between a main wing and a fuselage thereof includes providing a plurality of sensors upon the aircraft, configured for sensing motion and/or mechanical stress of the main wing and/or the fuselage and producing signals indicative thereof, and providing a plurality of active suspension elements interconnecting the wing and the fuselage, the active suspension elements being configured to move at least in response to the signals to adjust a position of the wing with respect to the fuselage.

15 Claims, 9 Drawing Sheets ns. In
particular, the present application relates to an aircraft wing-
to-fuselage joint with an active suspension connection.

AIRCRAFT WING-TO-FUSELAGE JOINT WITH ACTIVE SUSPENSION AND METHOD

FIELD OF THE DISCLOSURE

The present application relates to aircraft structures. In particular, the present application relates to an aircraft wing-to-fuselage joint with an active suspension connection.

BACKGROUND

Fixed-wing aircraft generally include a fuselage and a main wing that supports the fuselage. Aerodynamic forces upon the main wing are transmitted from the wing to the aircraft fuselage, and the load of the fuselage is imposed upon the main wing. The wing-to-fuselage joint, or the structural connection between the main wing and the fuselage, is thus a major component of the airframe. Through this connection the wing transmits significant structural loads to the aircraft fuselage, including forces that move the aircraft as a whole and also structural stresses such as bending stress, torsional stress, vibration, etc.

Different variants of fixed wing-to-body joints, each having various limitations, have been used on commercial aircraft for decades. Currently, there are several common structural configurations for joining the main wing to the fuselage of a commercial airplane. These various configurations generally present a structurally indeterminate wing-to-body connection which requires the fuselage structure to be capable of sustaining deflections imposed by wing bending. These deflections present the significant issue of fuselage deformation as a result of wing bending.

Stress transmitted from aircraft wings into the fuselage via the wing-to-body joint is a significant concern in aircraft design, since it affects the strength, durability and other aspects of the aircraft. Existing rigid wing attachment points present limitations to the fuselage/wing construction and sizing due to deflections imposed upon the fuselage by wing bending. For example, many known wing-to-body joints transfer wing bending moments directly to the fuselage. Other known wing-to-body joints can at least partially isolate the fuselage from wing bending moments, but the fuselage contour can still be forced out of shape by horizontal and vertical forces upon the wing. Also, some prior wing-to-body joint solutions generally do not separate wing torsion and vibration modes from the fuselage pitch mode as a contributor to wing flutter phenomena. In addition to structural and operational effects on the airframe, many existing wing-to-body joint configurations have significant limitations in suppressing turbulence effects and wing-mounted engine vibrations, which have great effects on passenger comfort.

The present application is directed toward at least one of the above-mentioned concerns.

SUMMARY

In accordance with one embodiment thereof, the present disclosure provides an aircraft including a fuselage, a wing, and a decoupled joint, interconnecting the fuselage and the wing.

In accordance with another embodiment thereof, the disclosure provides an aircraft having a fuselage, a main wing, and an active suspension system, interconnecting the fuselage and the main wing.

In accordance with another embodiment thereof, the disclosure provides a method of adapting an aircraft to attenuate forces between a wing and a fuselage thereof. The method includes providing a plurality of sensors upon the aircraft, configured for sensing motion and/or mechanical stress of the wing and/or the fuselage and producing signals indicative thereof, and providing a plurality of active suspension elements interconnecting the wing and the fuselage, the active suspension elements being configured to move at least in response to the signals, to adjust a position of the wing.

Figure 1:
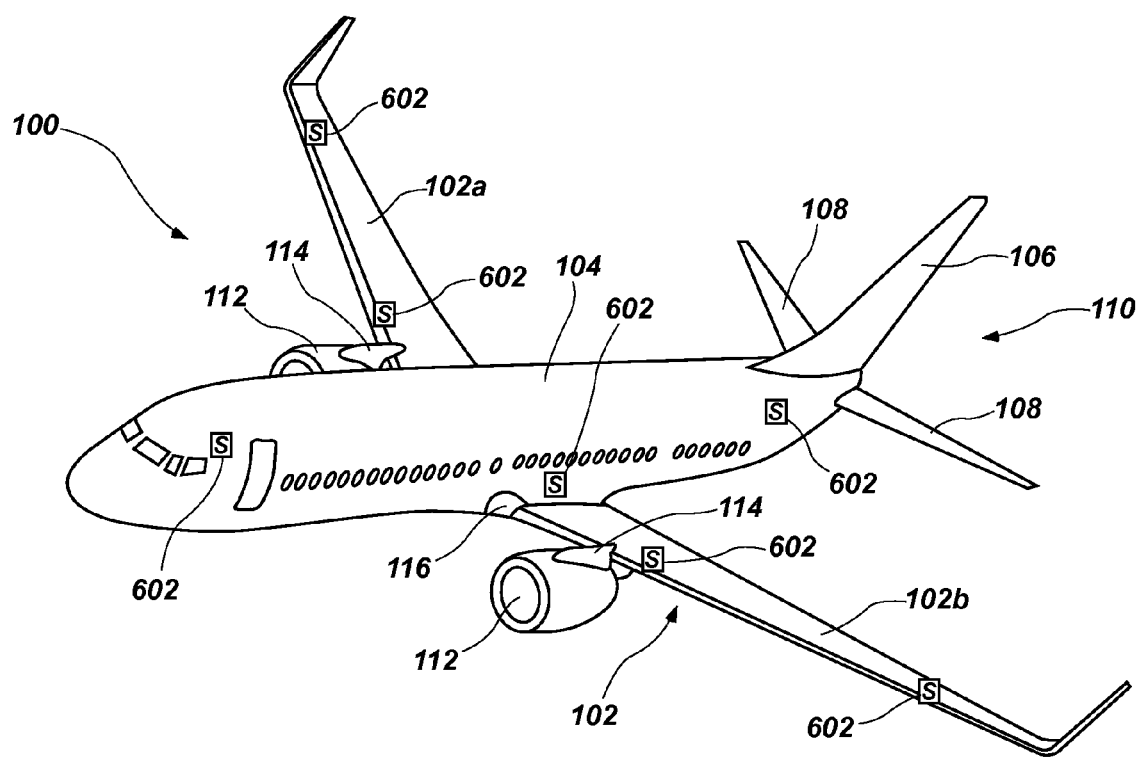
FIG. 1 is a perspective view of an embodiment of an aircraft having a wing-to-body joint with an active suspension system in accordance with the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Shown in FIG. 1 is an aircraft 100, generally including a main wing 102, an elongate fuselage 104 supported approximately at its midpoint upon the main wing 102, and having a rudder 106 and elevators 108 at the tail 110 of the aircraft. As used herein, the term "main wing" has reference to the entire main wing structure of the aircraft 100, including both the left and right portions of the main wing. Thus, the aircraft shown in FIG. 1 includes a single main wing 102, having left and right portions. The aircraft 100 also includes engines 112 for providing propulsion, which in this case are turbojet engines mounted upon pylons 114 below the main wing 102. The aircraft 100 also includes an aerodynamic fairing 116 that provides a smooth external transition between the main wing 102 and the fuselage 104 of the aircraft. This wing-to-body fairing 116 encloses the region in which the fuselage 104 is joined to the main wing 102, and can also enclose the aircraft landing gear and other components (not shown).

It is to be understood that the aircraft 100 shown in FIG. 1 is only one of many types of configurations of fixed-wing aircraft, and application of the present disclosure is not limited to this particular configuration. Nor is the system disclosed herein limited to commercial aircraft or aircraft of any particular size. Aircraft of different sizes, having different types of engines, different wing configurations, etc. can be configured with a wing-to-body joint having an active suspension system, in accordance with the present disclosure.

As noted above, aerodynamic forces upon the main wing of a fixed-wing aircraft are transmitted from the wing to the aircraft fuselage through the wing-to-fuselage joint. Through this joint the wing transmits significant structural loads including bending stress, torsional stress, vibration, etc. into the rest of the airframe. Typical rigid wing attachment points present limitations to the fuselage/wing joint due to the force deflections imposed upon the fuselage by bending of the wing. Stress transmitted from aircraft wings into the fuselage via the wing-to-body joint is a significant concern in aircraft design, since it affects the strength, durability and other aspects of the aircraft.

Figure 2:
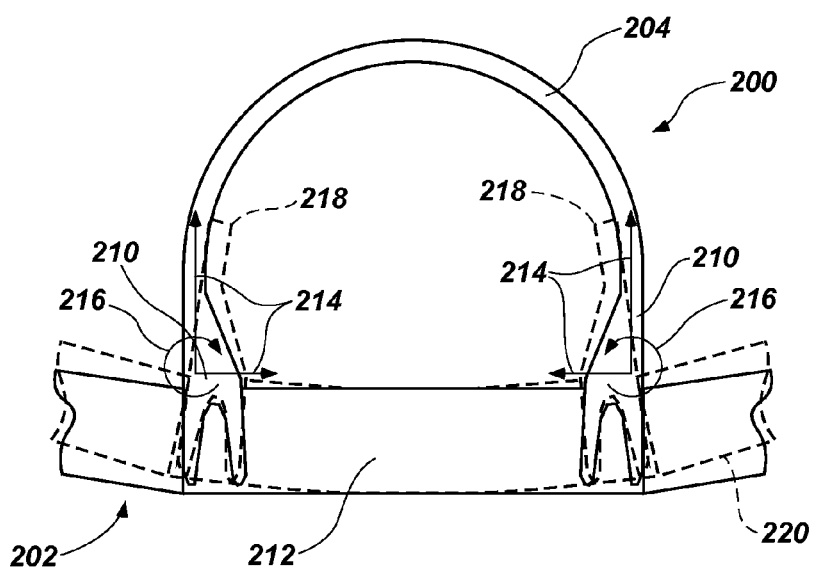
FIG. 2 is a cross-sectional view of an aircraft fuselage at the wing joint location, the aircraft having a pickle fork-type wing-to-body joint.
Figure 3:
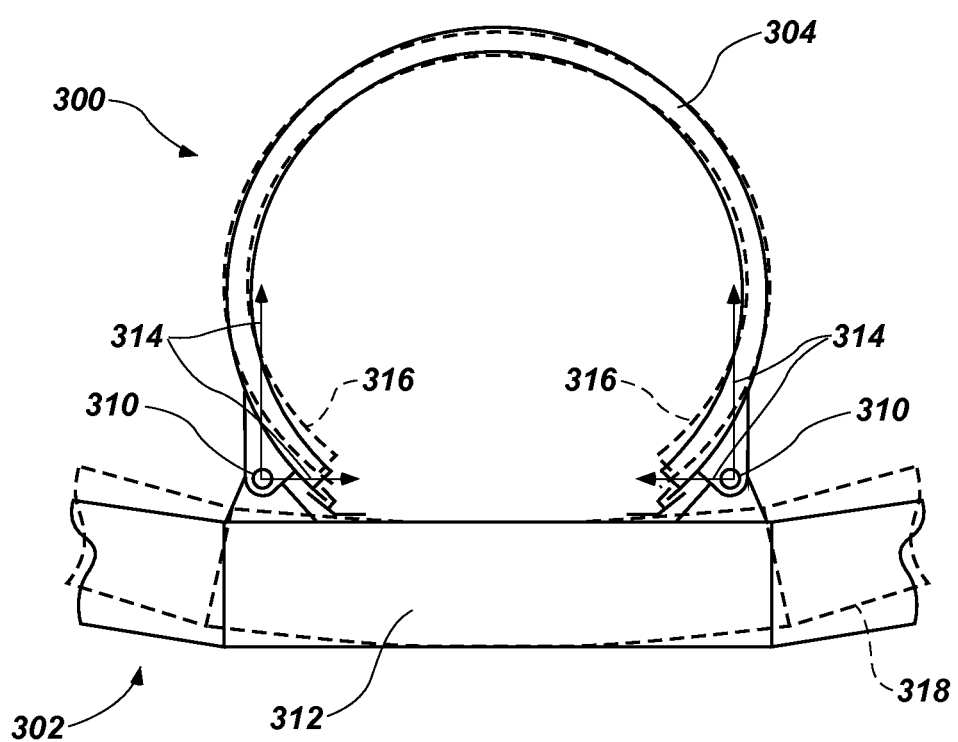
FIG. 3 is a cross-sectional view of an aircraft fuselage at the wing joint location, the aircraft having a pin-type wing-to-body joint.

Currently, there are several common structural configurations for joining the main wing to the fuselage of a commercial airplane. Two common variants of fixed wing-to-body joints are shown in FIGS. 2 and 3. Shown in FIG. 2 is a cross-sectional view of an aircraft 200 having a main wing 202 and a fuselage 204. This aircraft 200 includes what is called a "pickle fork" fitting at the front and rear main spars of the main wing. In the cross-sectional view, a main spar 212 of the wing is visible, to which a pair of pickle fork fittings 210 are fixedly attached. The pickle fork fittings 210 extend upward into the side wall of the fuselage 204, and thus transmit horizontal and vertical forces, represented by arrows 214, and bending moments, represented by arrows 216, from the wing 202 into the fuselage 204. Because of this configuration, when the wing 202 deflects, as shown in dashed lines at 220, the pickle fork fittings 210 also deflect, as shown in dashed lines at 218, causing corresponding deflection and deformation of the fuselage 204. It is to be understood that the magnitude of deflection of the wing 202 shown at 220 and of the pickle fork members 210 shown at 218 in FIG. 2 may be exaggerated for illustrative purposes.

Some aircraft employ a combination of a "pickle fork" fitting at the front spar, a trap panel at the rear spar, and a "flex-tee/Pi-fitting" over-wing attachment. The term "trap panel" is well known to those of skill in the field of aircraft structures, and is short for trapezoidal panel. A trapezoidal panel is a panel that is attached to the rear spar of the main wing, in line with the fuselage skin. Its purpose is to transfer loads between the fuselage and the wing. Trap panels are one step closer to a wider spread load exchange between the wing and the fuselage. A flex-tee/Pi-fitting combination is a structural feature that is commonly used to join aircraft fuselage frames to the wing in the area above the wing top skin (i.e. the region of smaller fuselage frames located above the wing between the front and rear spars of the wing). This type of structure is well known to those of skill in the area of aircraft structures. The flex-tee/Pi-fitting combination enables a flexible fuselage reaction to wing bending, while retaining a relatively high capacity to withstand cabin pressure loads. While pickle fork and other types of connections provide a relatively rigid wing-to-body joint, vertical and horizontal forces as well as bending moments are transferred from the wing to the fuselage, causing the fuselage shape to change depending on the amount of wing displacement under aerodynamic loads. These wing attachment configurations can therefore produce fuselage deformation as a result of wing bending.

Another type of wing-to-body joint that is used in commercial aircraft is the pin-type joint, and example of which is shown in FIG. 3. This cross-sectional view shows an aircraft 300 having a main wing 302 and a fuselage 304. In this configuration, the fuselage 304 is connected to the structure of the main wing 302 with pin joints 310 that connect between the fuselage 304 and the main spar 312 of the wing. These pin joints 310 at least partially isolate the fuselage 304 from wing bending moments. Pin type wing-to-body joints transmit horizontal and vertical forces, indicated by arrows 314, into the fuselage, but prevent wing bending moments from being transferred directly to the fuselage. However, the fuselage contour can still be forced out of shape by the reaction of the horizontal and vertical forces through the pin joints, as indicated by the deformed fuselage contour shown in dashed lines at 316. It is to be understood that the magnitude of deflection of the wing fuselage 304 shown at 316 in FIG. 3 may be exaggerated for illustrative purposes.

There are other known wing-to-body joint configurations in addition to those shown in FIGS. 2 and 3, but they all tend to transmit stress from the wing structure into the fuselage, and thus cause deformation of the fuselage. In addition, many wing-to-body joint configurations do not significantly separate wing torsion and vibration modes from the fuselage pitch mode as a contributor to wing flutter phenomena. Many existing wing-to-body joint configurations also have significant limitations in suppressing turbulence effects and wing-mounted engine vibrations, which have great effects on passenger comfort.

Advantageously, as disclosed herein, a decoupled wing-to-body joint has been developed that can reduce the deflections and stress imposed upon an aircraft fuselage by wing bending, and can also reduce the effects of turbulence upon passenger comfort. As used herein, the term "decoupled" is intended to mean a joint in which the wing is not fixedly or rigidly or even merely pivotally connected to the fuselage. The decoupled joint disclosed herein decouples the entire main wing, rather than merely a portion of it, as is the case in swing-wing aircraft, for example. In a "decoupled" joint, as that term is used herein, the wing can move with respect to the fuselage in up to six degrees of freedom (i.e. motion in x, y, and z directions, and rotation about the x, y and z axes). In one embodiment, the decoupled wing-to-body joint disclosed herein includes a power-actuated, computer-controlled active suspension system that connects the aircraft main wing to the fuselage. The active suspension is integrated into the airplane in order to reduce the transmission of wing bending-induced static loads to the fuselage structure, to dampen the dynamic loading that is transferred from the wing to the fuselage, and to actively control dynamic interaction between the fuselage and the main wing in such cases as turbulence and flutter.

Fundamental principles of active suspension systems have been integrated into automotive and some other products. Traditional suspension systems that have been used in automobiles and other applications have traditionally relied upon a combination of springs and shock absorbers to dampen impact loads and help maintain a relatively constant orientation of the vehicle. More recently, active suspension systems have been developed that rapidly sense changes in loads and vehicle motion, and actively operate to counter them.

Active suspension systems for motor vehicles have been developed by Bose Corporation and Lotus Engineering, USA, for example. Such systems typically use an actuator, such as a linear electromagnetic motor, at each wheel of the vehicle in lieu of a conventional shock-and-spring setup. Unlike conventional fluid-based shock absorbers (dampers), the actuators in an active suspension system are not limited by their own inertia. Instead, the actuators can extend and compress at a much greater speed than conventional shock absorbers, and do so under the command of a computer controller, which extends or retracts the actuator in real time in response to sensor inputs and other data. These sensors detect motion of different parts of the vehicle, and the controller can receive the sensor input and make adjustments to the system fast enough that adjustments are made before the vehicle inertia is overcome by any new force or stress. Increasingly fast computing capabilities and the increasing reliability of mechanical actuating systems are part of what has made active suspension systems a reality. The speed of the computer controller can compensate for a much wider range of motion, shock and vibration in the vehicle than is possible with conventional shock and spring configurations. For example, the motion of each wheel of an automobile can be controlled so that the body of the car remains substantially level regardless of what's happening at each wheel. The actuators of an active suspension system can also counteract the body motion of the car while accelerating, braking and cornering, giving the driver a greater sense of control and reducing pitching and rolling of the vehicle cabin.

Figure 4:
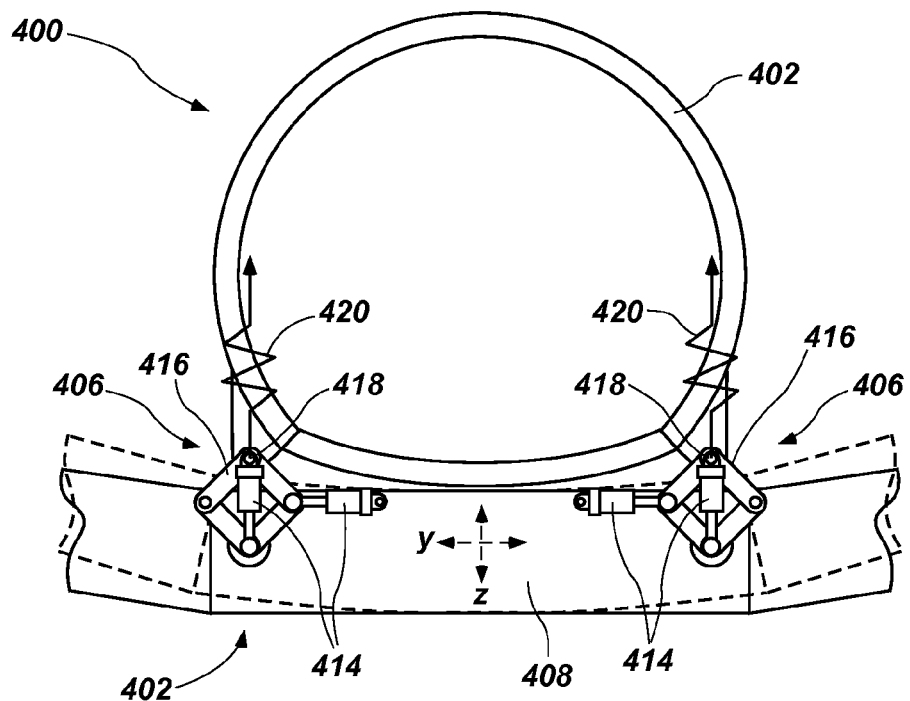
FIG. 4 is a cross-sectional diagram of an aircraft fuselage at the wing joint location, the aircraft having an embodiment of a wing-to-body joint with an active suspension system in accordance with the present disclosure.
Figure 5:
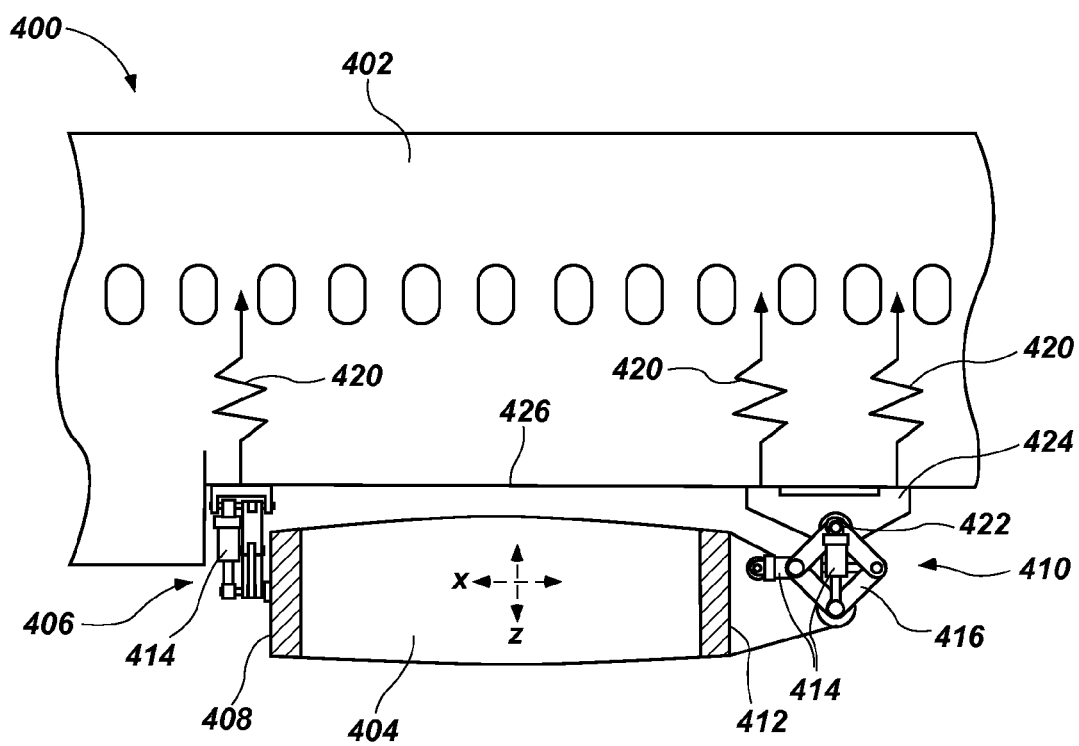
FIG. 5 is a side view of the aircraft fuselage and wing structure of the embodiment of FIG. 4, showing the fore-to-aft location of actuator components of the wing-to-body joint active suspension system.

While active suspension systems are known in the automotive world, it does not appear that the concept of an active suspension system has previously been applied to the wing-to-body joint of an aircraft. One embodiment of a wing-to-body joint having an active suspension in accordance with the present disclosure is shown in FIGS. 4-5. Provided in FIG. 4 is a cross-sectional diagram of a fuselage 402 and wing 404 of an aircraft 400, the cross-section taken at the wing joint location. Provided in FIG. 5 is a side view of the fuselage 402 and sectional view of the wing structure 404 of the aircraft 400, showing the fore-to-aft location of actuator components of the wing-to-body joint active suspension system. The views of FIGS. 4 and 5 are taken at right angles to each other, and the relative x, y and z coordinate axes are shown in the respective views.

A wing-to-body joint having an active suspension system, as disclosed herein, provides computer-controlled hydraulic or electro-magnetic actuators 414 at the main attachment points in the wing-to-fuselage joint. The actuators 414 are strategically grouped and connected to at least the four major wing-to-fuselage joints or connection points. Two forward actuator/connection units 406 can be provided at the front spar 408 and two rear actuator/connection units 410 are provided at the rear spar 412. The actuator/connection units 406, 410 are designed to effectively control all six degrees of freedom (i.e. motion in x, y, and z directions, and rotation about the x, y and z axes) of the wing 404 relative to the fuselage 402. Each actuator unit 406, 410 includes a pair of motion transducers 414, such as hydraulic cylinders, coupled to the pivot points of a scissor mechanism 416. Extension or retraction of the motion transducers 414 causes the respective scissor mechanism 416 to extend or retract, thus changing the distance between the wing 404 and fuselage 402 at the location of the particular actuator. This allows the wing 404 to be tilted at-will with respect to two orthogonal axes in a horizontal plane.

Since side-to-side and fore-to-aft motion of the wing 404 relative to the fuselage 402 is not desired, the connections at the front spar 408 and rear spar 412 with the scissors mechanisms 416 allows up and down motion at each connection point, but resists side-to-side motion. In the configuration shown in FIGS. 4 and 5 the forward scissor mechanisms 416 are oriented generally perpendicular to the aft scissor mechanisms 416. The scissor mechanisms 416 of the forward actuator units 406 are connected to the base structure 426 of the fuselage 402 at forward pin connections 418. The scissor mechanisms 416 of the rear actuator units 410 are connected to the base structure 426 of the fuselage 402 at aft pin connections 422 of a mounting bracket 424. With this configuration, attenuated vertical forces, represented by arrows 420, are transmitted into the fuselage 402, but the fuselage is substantially isolated from lateral forces and bending moments being transmitted from the wing, and side-to-side and fore-to-aft motion of the wing 404 relative to the fuselage 402 is resisted.

Figure 6:
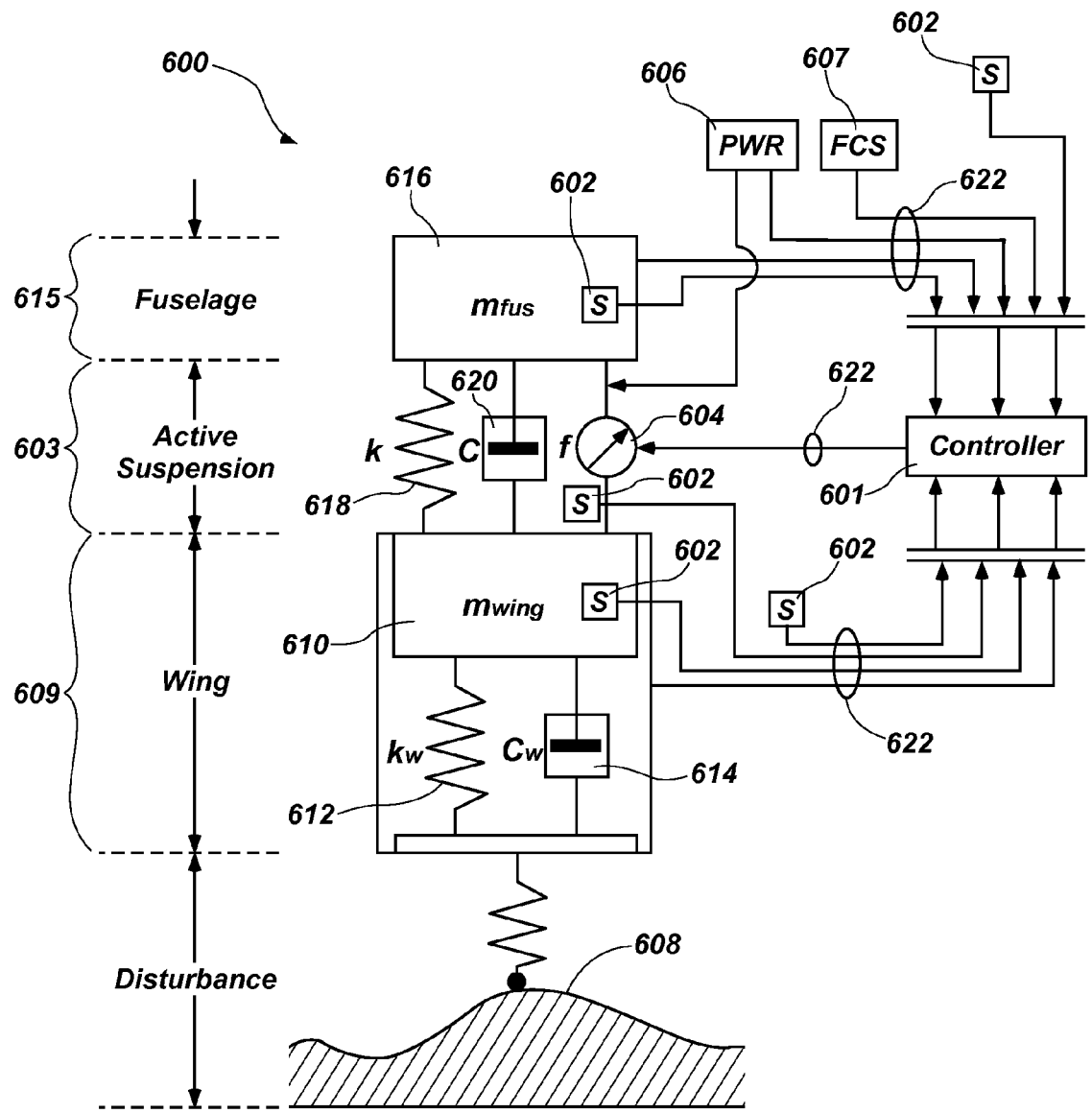
FIG. 6 is schematic diagram of an embodiment of a wing-to-body joint active suspension system in accordance with the present disclosure.

FIG. 6 provides a schematic diagram of an embodiment of a wing-to-body joint active suspension system 600 in accordance with the present disclosure. The system 600 generally includes a central computer controller 601, sensors 602, actuators 604, a power source 606, and flight control system 607. While only one actuator 604 is shown, this is intended to be representative of multiple actuators, also referred to herein as active suspension elements. In the schematic diagram of FIG. 6, "Disturbance" 608 represents any surrounding affect exerted on the airplane, such as the effect of air turbulence, symbolically represented as a semi-soft contact of the turbulent air to the wing surface. The wing structure, indicated generally at 609, is represented to include a mass 610, denoted $m_{wing}$, a level of structural elasticity suggested by a spring 612 and denoted $k_w$, and a shock absorbing capacity suggested by a damping strut 614 and denoted $c_w$. For purposes of this diagram, the fuselage 615 is represented as a mass 616 labeled $m_{fus}$.

The active suspension system 603 is interposed between the fuselage 615 and the wing 609, and includes three physical characteristics: a level of structural elasticity suggested by a spring 618 and denoted k, a shock absorbing capacity suggested by a damping strut 620 and denoted c, and a variable dynamic force suggested by an actuator 604 and denoted f. In practice, the variable dynamic force and some or all of the structural elasticity and damping is provided by the multiple actuators 604 of the active suspension system 603. Control inputs to these physical actuators can be provided by hydraulic or electro-mechanical servos (not shown). Each actuator 604 can be an active suspension strut, which can be a hydraulic, pneumatic, electromechanical, or any other type of suitable force and motion device. The actuator 604 is under direct control of the controller 601, and actively extends or retracts in real time in response to commands (i.e. output signals)

from the controller 601 to change the position of the wing 609. This real-time control of the wing position and orientation and of the wing-fuselage connection allows dynamic control of the actuators 604 in direct response to flight conditions.

The sensors 602 measure the relative position and/or motion of different parts of the aircraft and different components of the active suspension system 603 and provide sensor signals to the controller 601. One exemplary arrangement of sensors is schematically illustrated in FIG. 1. The aircraft can include multiple sensors 602 along the main wing 102, sensors 602 in the fuselage 104, and sensors 602 associated with the actuators 604 and/or joints of the active suspension system 603, which are shown in FIG. 6. A variety of sensor types can be used, including accelerometers, mechanical stress sensors, proximity sensors, position sensors, orientation sensors, etc. The sensing systems can be configured and positioned to detect vibration, tension, flexion, speed, position, direction, acceleration and other factors, in addition to the sensors that are normally included in aircraft that do not have an actively-suspended wing control system.

The signals from the sensors 602 become part of the input signals to the computer controller 601 that controls the active suspension system 603. The controller 601 can be a microcomputer device that is provided with a processor and system memory, and programming code for controlling the actuators in response to sensor and other input to modulate dynamic system response. The controller 601 and related components provide control system electronic processing hardware, including a real-time, high bandwidth processor that can receive numerous feedback signal inputs. This processor 601 can include multiple processors or a multicore CPU that is programmed to execute distributed threads of control system application software or firmware. Alternatively, the processor can be a field-programmable gate array (FPGA) with a digital signal processor (DSP) configured to handle the time requirements and complexity of active wing suspension control laws.

The control system software, which is stored in memory in the controller 601, is based on an understanding of aircraft dynamic system behavior, and provides corresponding software code for effectively controlling the wing-to-body connection. The software can include an aircraft system model, and an actively-suspended wing model, and is configured to provide output via those models based on input signals from the system sensors 602, feedback from the flight control system 607, flight parameters, and conditioned inputs from the flight control system 607 as a result of pilot or autopilot input. Very fast computing speeds and increasing reliability of mechanical actuating systems allow the application of adjustable dynamic systems in primary structural joints on an aircraft, and allows the controller 601 to dynamically control the actuators 604. The central computer 601 receives dynamic input signals from the sensors 602 at various locations on the aircraft, and combines and/or compares the sensor readings with other data, such as airspeed, attitude and other indicators, such as from the flight control system (FCS) 607. Using custom-created software, the computer controller 601 can calculate an optimal dynamic response and send output in the form of command signals to the actuators 604. The actuators 604 dynamically adjust relative position between the main wing 609 and the fuselage 615 in response to the output signals from the controller 601 to compensate for relative motion of the wing and fuselage, as detected by the sensors 602.

The active wing suspension control system 600 also includes a signal distribution system 622, which provides a network of connections (e.g. electrical wires, hydraulic conduits, etc.) to support control of the actuators 604 and to direct sensor feedback/input signals from sensors 602 and other sources to the controller 601. As will be appreciated by those of skill in the art, the signal distribution system 622 can also include redundant signal distribution and actuator feedback networks (not shown) as a safety feature. Power supplies 606 and/or power supply paths to the subsystem components can also be made redundant to aid system reliability.

From a dynamic perspective, the system 600 operates by monitoring and recording wing motion parameters, monitoring and recording fuselage motion parameters, comparing wing and fuselage motion signals in the controller unit 601 and applying corrective actuation via the active suspension system 603 between the wing and fuselage. The corrective actuation is calculated to reduce and/or eliminate fuselage short wave dynamic motion induced by wing vibrations (turbulence or flutter). From a static loading perspective, the system helps to reduce or eliminate fuselage deformations induced by wing bending, and can also be used to adjust the relative position of the wing and fuselage at specific phases of flight, such as takeoff and landing. This latter feature can help reduce the need for high lift devices, and is discussed in more detail below.

Figure 7:
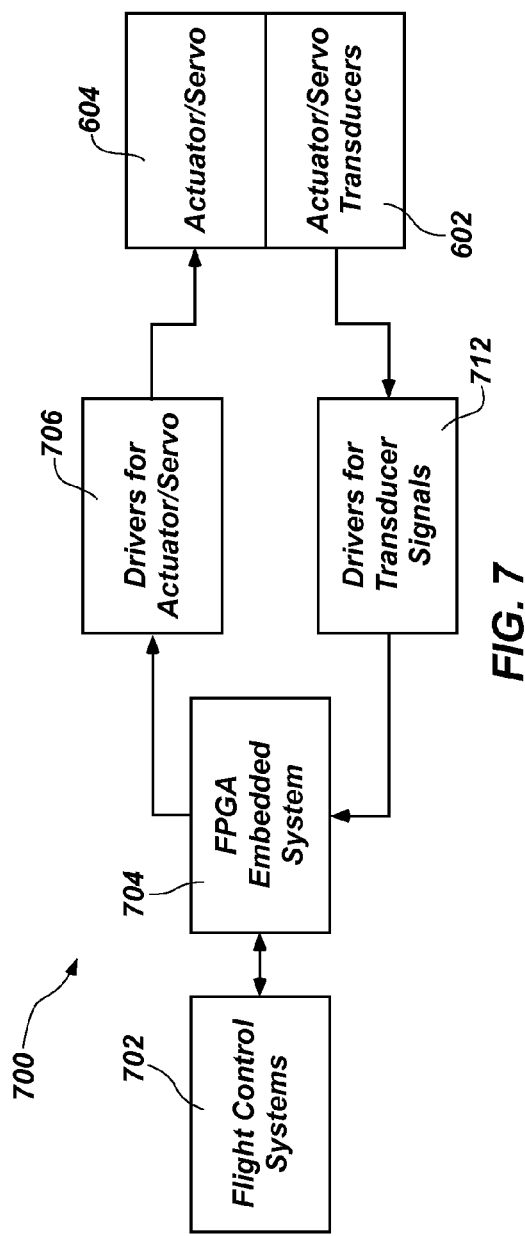
FIG. 7 is a block diagram of a signal processing control system for a wing-to-body joint active suspension system in accordance with the present disclosure.
Figure 8:
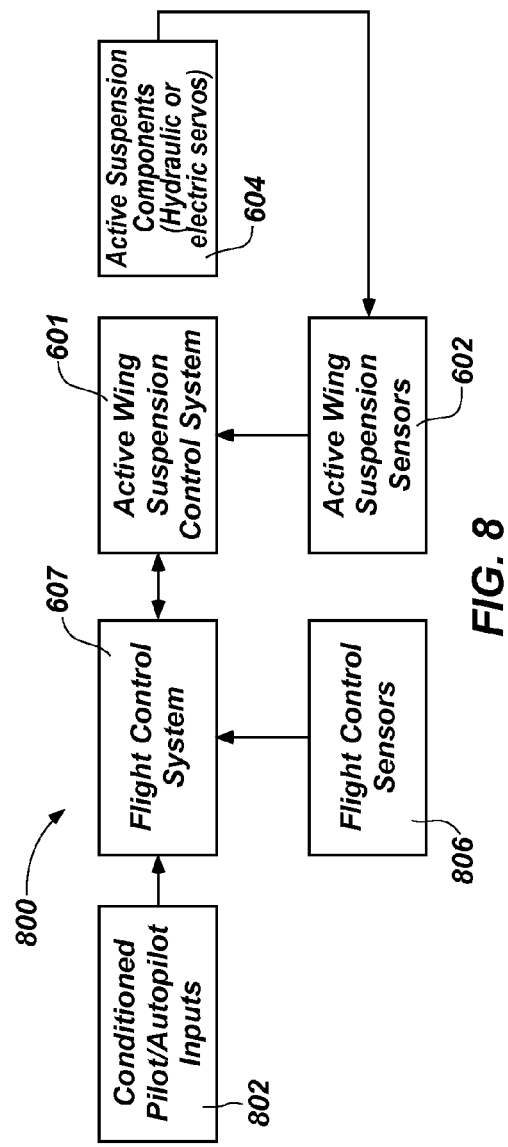
FIG. 8 is a block diagram of an embodiment of control system relationships for a wing-to-body joint active suspension system in accordance with the present disclosure.
Figure 9:
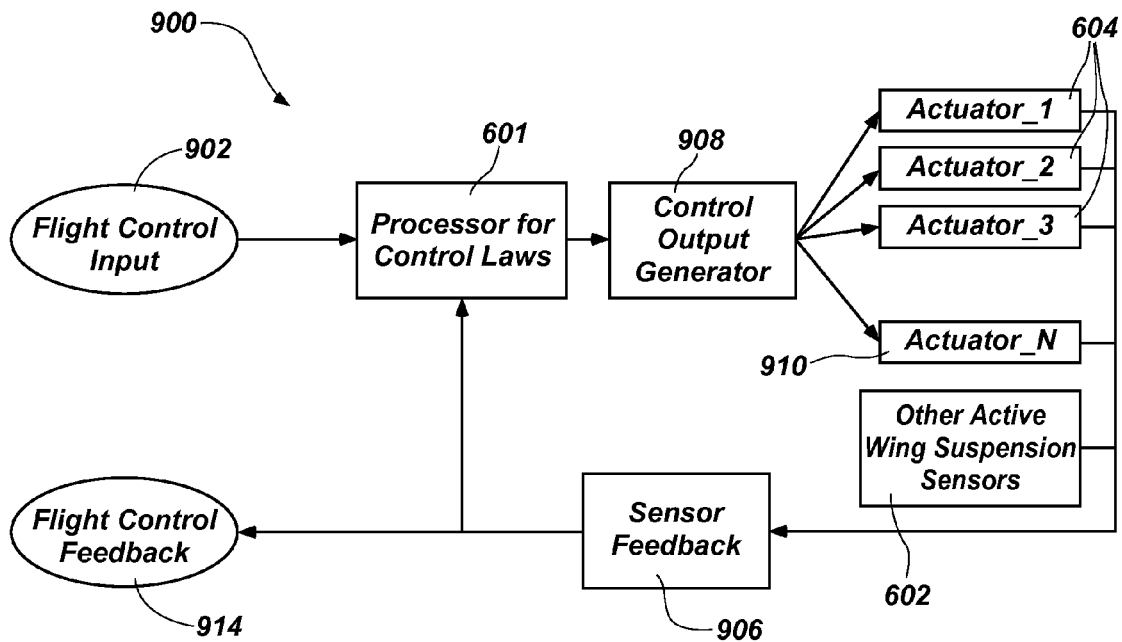
FIG. 9 is a block diagram of an embodiment of the elements of an active wing suspension control system in accordance with the present disclosure.

Shown in FIGS. 7-9 are block diagrams that show the major components and functional interactions of an embodiment of the active wing suspension control system. Shown in FIG. 7 is a block diagram of a signal processing control system 700 showing how the wing-to-body joint active suspension system is integrated with the aircraft flight control system 702. The flight control system 702 provides input, such as airspeed, altitude, attitude, as well as flight control surface status, etc., to an FPGA embedded system 601, which is the controller that controls the active suspension system (603 in FIG. 6). The FPGA 601 is programmed to run a state machine corresponding to the selected system control law. It is supported by high-throughput random access memory, and includes drivers 706 for the actuators/servos. These drivers provide the actual actuator control signals, which are sent to the actuators 604.

The actuators or servos 604 include sensors or transducers 602 to detect actual motion of these devices. These sensors 602 provide feedback to the drivers for the transducer signals 712, which convert these signals into input back to the FPGA 601. In this way, a feedback loop is created in which the signals that are sent to the actuators 604 can be continually adjusted based on actual operation of the actuators, as well as commands of the system to adjust for external effects on the aircraft.

The block diagram of FIG. 8 illustrates one embodiment of the control system relationships 800 for a wing-to-body joint active suspension system in accordance with the present disclosure. As a pilot or an autopilot system operates the aircraft, the flight control system 607 (e.g. flight control computer) receives conditioned inputs 802 from the pilot or autopilot. These inputs include commands for aircraft control surfaces, engines and other mechanical systems affecting flight performance that are not specifically related to the active wing suspension control system. The flight control system 607 also receives input from flight control sensors 806. This can include sensor input from flight control system components that are not specific to the active wing suspension system, such as servo feedback from flaps, rudder, or elevator actuators, for example, as well as input from altitude, airspeed, attitude, and other indicators that are associated with the flight control system 607.

The flight control system 607 interfaces with the active wing suspension system controller 601, described above with respect to FIG. 6. The active wing suspension control system 601 can be programmed into the same physical computing device that also includes the flight control system 607, or it can be associated with a separate computing device. The active wing suspension control system further receives input from the active wing suspension sensors 602, which include the sensors on the wings, fuselage and sensors associated with the active suspension joint actuators 604 and related devices, as discussed above. The sensors associated with the active suspension joint actuators 604 and related devices in turn receive and report inputs that come from the active suspension components, allowing the feedback loop discussed in FIG. 7 to operate.

Provided in FIG. 9 is a block diagram showing the elements of an active wing suspension control system 900 in accordance with the present disclosure. Flight control input 902, as discussed above and indicated at least in part by block 802 in FIG. 8, is provided to the active wing suspension control system 601, which includes a processor that is programmed with the control laws for the active wing suspension, as discussed above. The active wing suspension control system also receives input from sensor feedback 906, as discussed above. With these inputs, the processor 601 provides signals to an output generator 908, which provides real-time control signals to the actuators 604, numbered 1 to N, of the active suspension system. The control system generates appropriate outputs for the actuators 604 based on control laws derived from the airplane active suspension model and flight performance parameters from other aircraft resources such as the control surfaces and vehicle models. As discussed above, the actuators 604 produce positional and/or performance feedback signals via active wing suspension system sensors 602, and this sensor data, along with signals from additional sensors 602, such as wing and fuselage sensors 602, shown in FIG. 1, can also be provided to precisely control the active suspension system for desired aircraft performance. The sensor feedback 906 is provided to the processor 601, and is also provided as flight control feedback 914 to the flight control system, so that the aircraft operator can be aware of the operational status of the active suspension system. The active suspension system can also be configured to allow operator control inputs in certain circumstances, such as for wing flare during takeoff or landing.

The system described above thus provides an active suspension that moves the wing relative to the body of an aircraft to avoid disturbances, rather than the disturbance moving the wing. This system can provide many benefits. It can improve passenger comfort by significantly reducing turbulence effects and passenger cabin vibrations caused by the transmission of wing bending and vibration and wing-mounted engines. This softens the ride for passengers.

Figure 10:
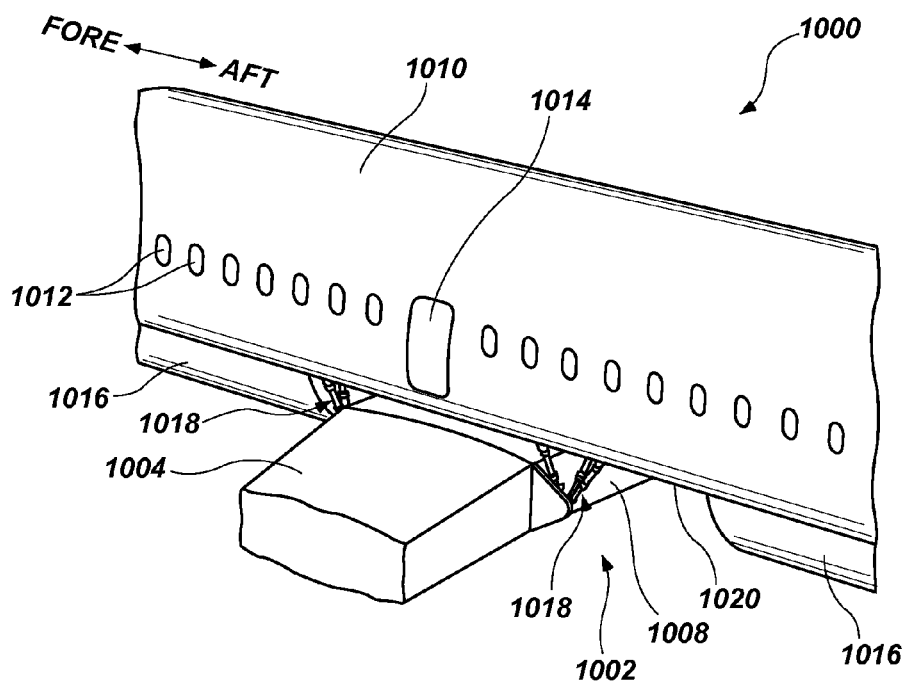
FIG. 10 is a top perspective view of an aircraft having an embodiment of a wing-to-body joint active suspension system in accordance with the present disclosure.
Figure 11:
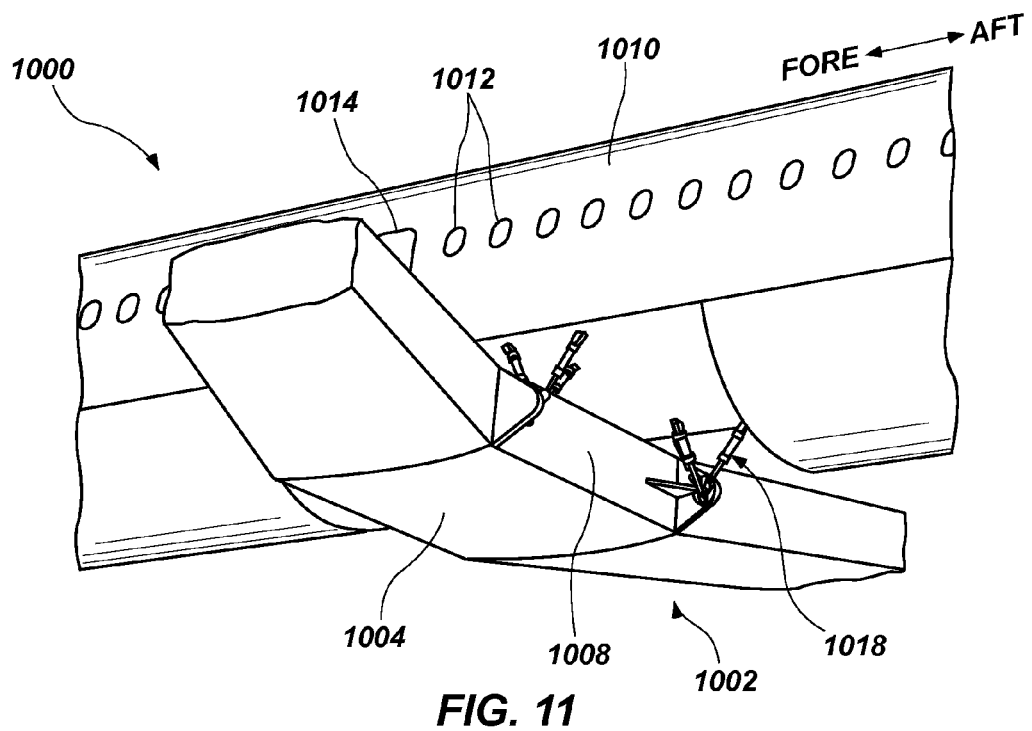
FIG. 11 is a bottom rear perspective view of the aircraft of FIG. 12.

Another embodiment of a wing-to-body joint with an active suspension system is shown in FIGS. 10-14. Shown in FIG. 10 is a top perspective view of an aircraft 1000 having an embodiment of a wing-to-body joint active suspension system 1002 in accordance with the present disclosure, and FIG. 11 is a bottom rear perspective view of the same. In these views the wing-to-body fairing (116 in FIG. 1) is removed to reveal the components of the wing-to-body joint 1002, and the main landing gear and related structures, which normally lie just aft of the main wing 1004, are not shown. Additionally, the wings 1004 are truncated and simplified, to show only the front spar 1006 and rear spar 1008, with general connecting structure therebetween. For illustrative purposes, the full wing span is not shown, and the leading and trailing edges of the wings, along with related wing structures are not shown. As with aircraft generally, the fuselage 1010 includes passenger windows 1012 and an emergency egress door 1014 over the main wing 1004. The lower part 1016 of the fuselage can include a forward cargo hold forward of the main wing 1004, and an aft cargo hold aft of the main wing 1004 and the landing gear bay region.

In the embodiment of FIGS. 10-14, the front main spar 1006 and rear main spar 1008 of the wing 1004 are attached to the floor 1020 of the aircraft fuselage 1010 via four groups 1018 of actuators, two attached at the left and right sides of the forward main spar 1006, and two attached at the left and right sides of the aft main spar 1008. These actuators can be hydraulic cylinders or other actuators. In this embodiment, each group 1018 of actuators includes three hydraulic cylinders 1022, attached to their respective spar in substantially orthogonal relationship. The actuators 1022 shown in FIGS. 10-14 are exemplary only, and are not necessarily intended to represent the actual size and shape of actuators that are or can be used in this application. However, those of skill in the art will recognize that since the primary forces that lift and control the aircraft act upon the main wing 1004, the connection between the wing 1004 and the fuselage 1010 must be sufficiently strong to withstand these forces in a wide variety of situations.

Figure 12:
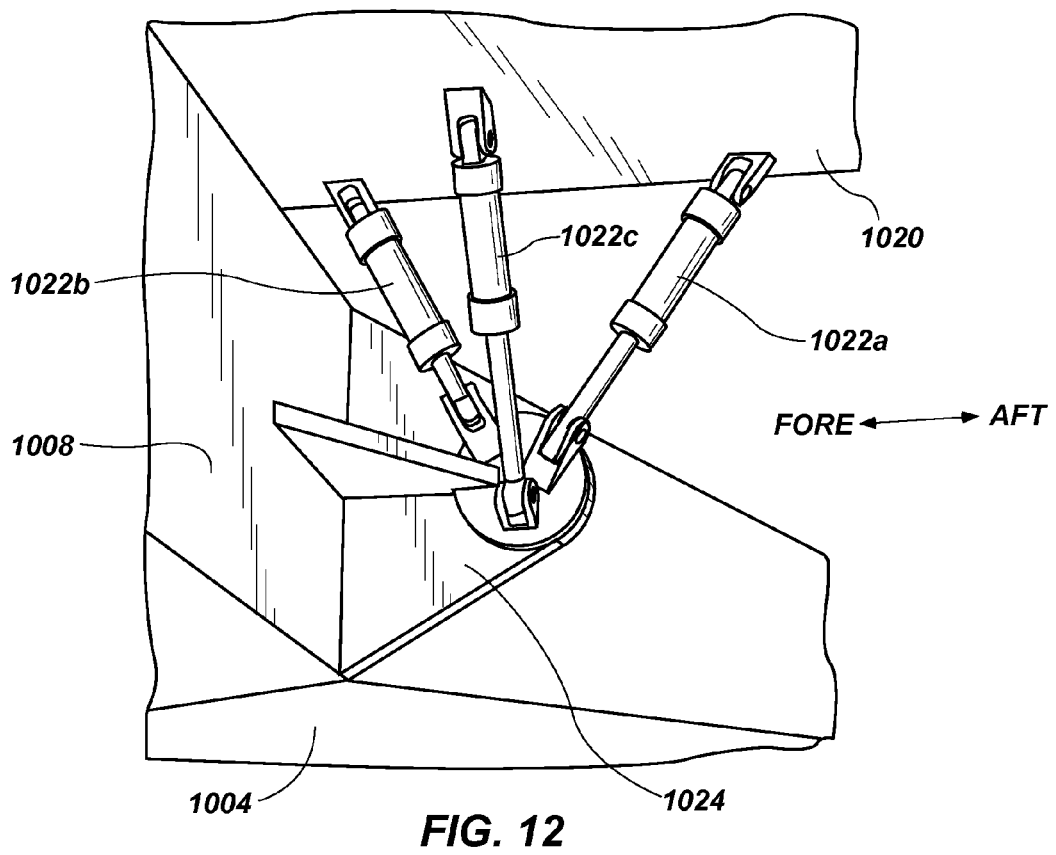
FIG. 12 is a close-up perspective view of one set of rear spar active suspension struts.

Shown in FIG. 12 is a close-up perspective view of one set or group 1018 of active suspension struts 1022 at the rear spar 1008. These struts 1022 are pivotally attached to a structural lobe 1024 protruding from the rear of the rear spar 1008, and pivotally attached to floor 1020 of the aircraft fuselage 1010. The struts 1022 are oriented substantially perpendicular to each other, generally defining a downwardly-pointed corner of a tetrahedron oriented at about a 45° angle relative to the axes of the aircraft 1000. This configuration allows each of the struts 1022 to affect the position and motion of the wing 1004 with respect to all of the three standard axes (x, y and z axes) of the aircraft. By virtue of the angle of the struts in relation to the aircraft, in the configuration shown in FIG. 12, two of the struts 1022a, b, are aligned to have a fore-to-aft component of motion (in addition to a vertical component of motion), while the third strut 1022c does not, and only provides a side-to-side component of motion. The opposing lateral side of the rear main spar 1008 includes a similar group 1018 of three struts.

Figure 13:
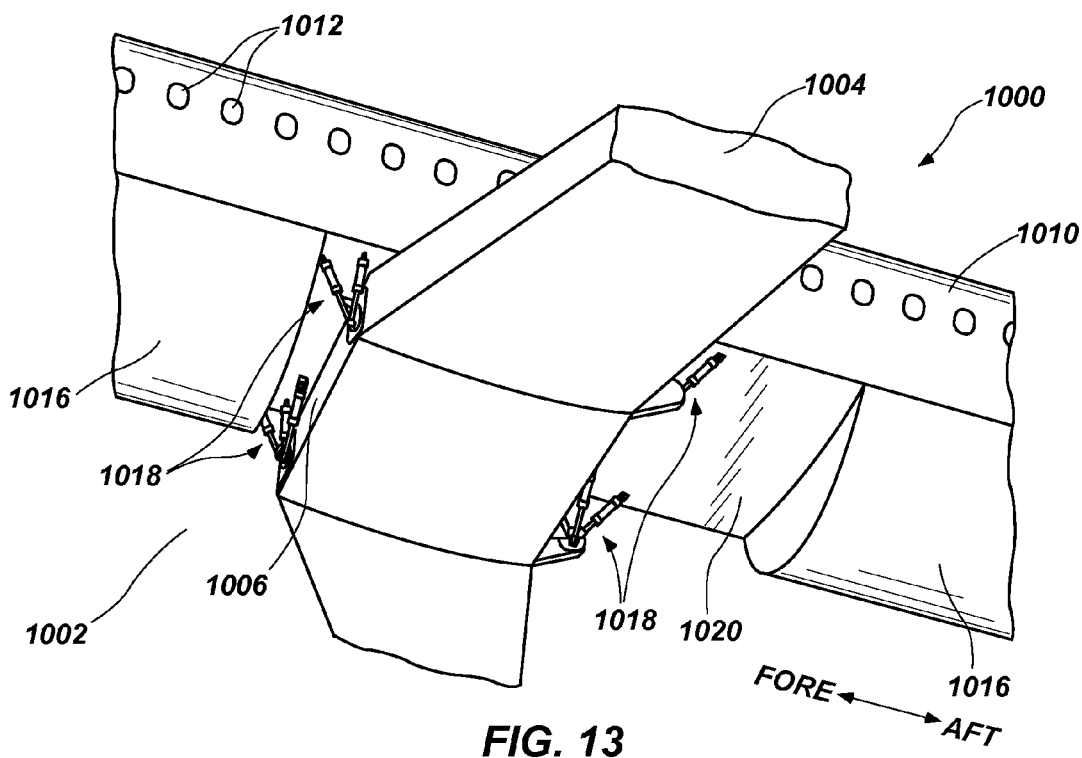
FIG. 13 is a bottom front perspective view of the aircraft of FIG. 12.
Figure 14:
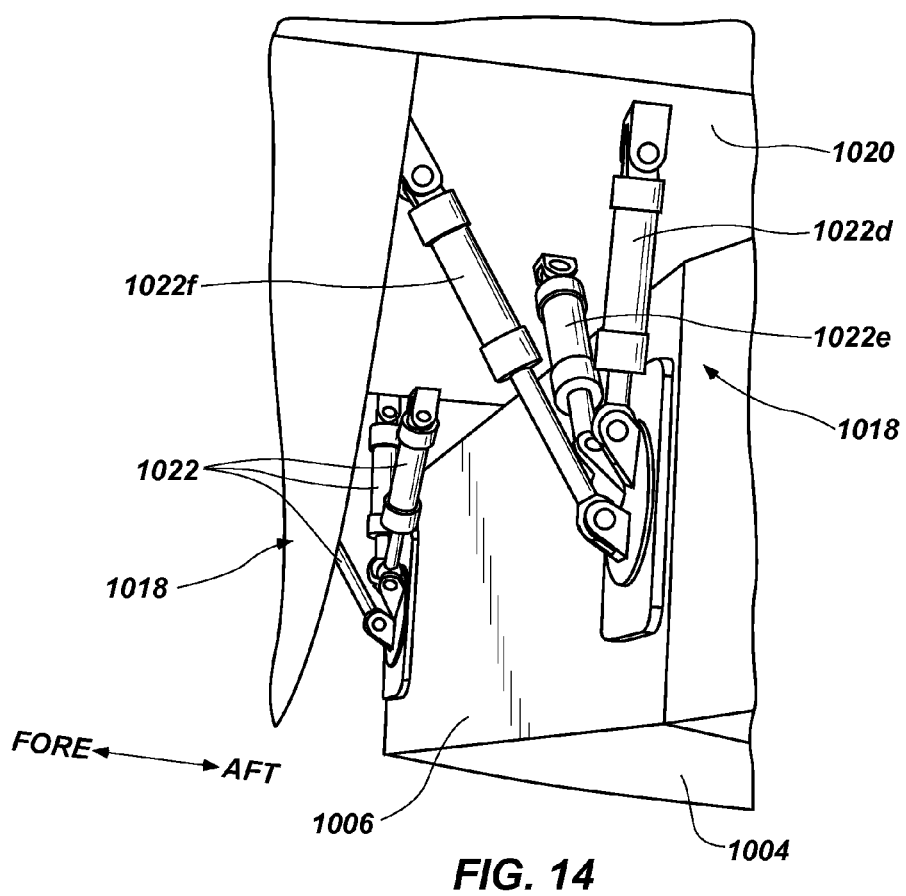
FIG. 14 is a close-up perspective view of the forward spar active suspension struts.

On the other hand, as shown in FIGS. 13 and 14, the actuators 1022 attached to the front main spar 1006 are also arranged in an inverted tetrahedral arrangement, with two of the struts 1022d, e, aligned to have a side-to-side component of motion (in addition to a vertical component of motion), while the third strut 1022f in this group only provides a fore-to-aft component of motion. The opposing lateral side of the front main spar 1006 includes a similar group 1018 of three struts. This arrangement of the active suspension struts 1022 thus provides twelve total struts 1022 connecting the wing 1004 to the fuselage 1010 of the aircraft 1000, with six of the struts 1022 having a side-to-side component of motion, six of the struts having a fore-to-aft component of motion, and four struts 1022, one at each corner of the wing 1004 in the suspension region, having only a side-to-side or fore-to-aft component of motion, in addition to any vertical component of motion. This provides the active suspension 1002 with substantially equal and symmetrical strength in all directions of possible motion of the wing 1004.

Though not shown in FIGS. 10-14, additional attachment devices can be provided between the wing 1004 and the aircraft fuselage 1010. For example, in addition to the active suspension elements, passive connection devices, such as struts, passive linkages and scissor devices like those shown in FIGS. 4 and 5, but without active suspension elements, can also be provided to increase the strength of connection of the wing. Additionally, safety devices and/or redundant connections can be provided in case of failure of any of the active wing suspension system components.

Figure 15:
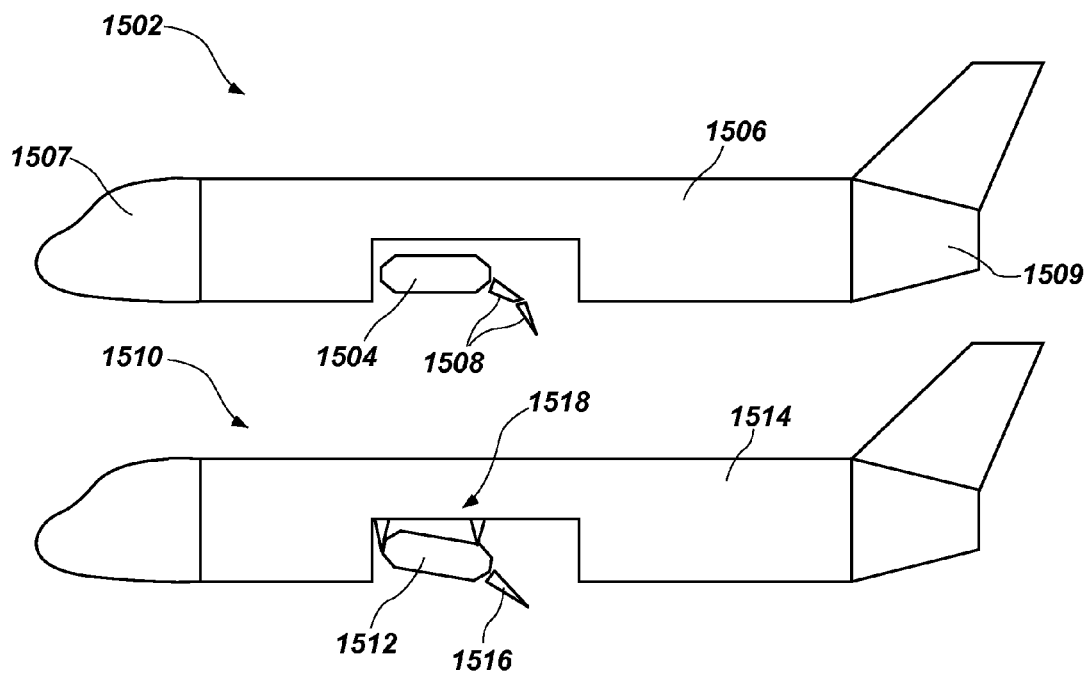
FIG. 15 is a conceptual side view of two aircraft, showing the landing and takeoff configuration of a conventional fixed wing, compared to the flared wing of an aircraft having an active suspension system interconnecting the wing and fuselage.

As noted above, the active suspension system disclosed herein can also be used to change the angle of attack of the main wing without moving the fuselage. This can allow independent control of the wing pitch angle relative to the fuselage, thus reducing the flare angle of the aircraft fuselage during takeoff and landing. Shown in FIG. 15 are conceptual side views of two aircraft in a landing or takeoff configuration. The first aircraft 1502 shown at the top of FIG. 15 is a conventional fixed wing aircraft, with a main wing 1504 in a fixed orientation relative to the aircraft fuselage 1506. During takeoff and landing, flaps 1508 are extended from the trailing edge of the main wing 1504 to provide additional lift and control of the aircraft. However, during actual takeoff or landing, the pitch of the whole aircraft 1502 is flared, with the nose 1507 up and the tail 1509 down. During takeoff this is done to change the angle of attack of the wing 1504 to allow the aircraft to climb. During landing, this is done to slow the aircraft and to take full advantage of ground effects. In both cases, if the flare of the aircraft 1502 is too great, there is a danger of a tail strike.

Advantageously, in addition to the advantages in the ability to modulate dynamic interaction between the wing and the fuselage that the present system provides, the active suspension system disclosed herein can also be used to adjust the relative wing/fuselage position for takeoff and landing. That is, the pitch of the main wing relative to the fuselage can be adjusted to lift the aircraft prior to fuselage roll during takeoff, and to provide the proper wing flare for landing while having a reduced flare of the whole aircraft, thus reducing the risk of a tailstrike on landing. Shown in the bottom portion of FIG. 15 is an aircraft 1510 having a main wing 1512 and a fuselage 1514. In this aircraft, the main wing 1512 is attached to the fuselage 1514 via an active suspension system 1518, as described above. The active suspension system 1518 allows the entire main wing 1512 to be flared relative to the fuselage 1514. This allows the angle of attack of the wing 1512 to be adjusted without any change in the pitch of the aircraft fuselage 1514, which helps reduce the need for high lift devices such as flaps. Specifically, in the image shown at the bottom of FIG. 15, the wing 1512 includes a single flap 1516, rather than the more extensive double flap 1508 on the conventional fixed wing 1504. The ability to adjust the pitch angle between the fuselage 1514 and the main wing 1512 can help minimize the risk of tailstrike during takeoff or landing, and can thus potentially eliminate the need for tailstrike pads. This can be particularly beneficial in the development of stretch models of existing aircraft, for example, which otherwise can involve modifying landing gear and other significant modifications.

Figure 16:
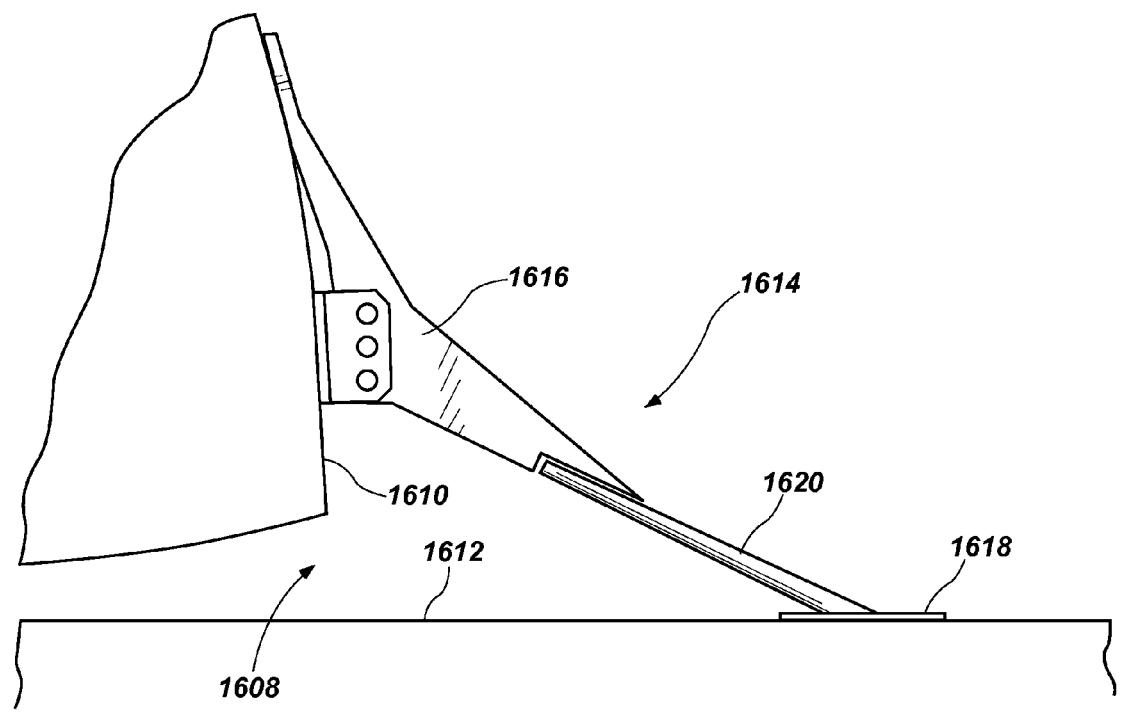
FIG. 16 is a partial cross-sectional view of an aircraft fuselage and active wing joint location, showing one embodiment of a flexible wing-to-body fairing.

With a main wing having an adjustable angle or position relative to the fuselage, a flexible wing-to-body fairing can be provided to provide a smooth transition surface between the wing and the fuselage, while also maintaining desired aerodynamic operation. Shown in FIG. 16 is a partial cross-sectional view of an aircraft fuselage 1610 and wing 1612 in the vicinity of an active wing-to-body joint 1608, showing one embodiment of a flexible wing-to-body fairing 1614. This fairing 1614 includes a fixed fairing support 1616, which is attached to the side of the aircraft fuselage 1610 above the wing 1612. A rub strip 1618 is provided on the top surface of the wing 1612, and a flexible and moveable fairing extension 1620 extends between the fixed fairing support 1616 and the rub strip 1618. As the wing 1612 moves relative to the fuselage 1610 of the aircraft, the fairing extension 1620 slidably extends and retracts between the wing 1612 and the fuselage 1610, thus enclosing the wing-to-body joint 1608, while allowing relative motion of the respective parts. Similar flexible wing-to-body fairing joints can also be provided at the leading and trailing edges of the wing 1612, and at fore and aft lower body transition regions. It is to be understood that this configuration of a flexible wing-to-body fairing is only one possible configuration, and other configurations can also be used.

The application of the decoupled wing-to-fuselage joint disclosed herein thus helps to alleviate loads going into the fuselage structure, helps eliminate fuselage deformation induced by wing bending, and helps resolve some design and static/fatigue sizing constraints imposed by more conventional rigid and fixed-point wing-to-fuselage attachments. With a decoupled wing-to-fuselage joint, structural loads that transfer from the wing to the fuselage are reduced to the dampened vertical force components, which can provide a more weight-efficient design of the fuselage and wing joint support structure. By decoupling the fuselage and the wing, this active suspension system can also reduce wing flutter effects, so that wing oscillations are dampened. The computer-controlled wing-to-fuselage joint/interaction can allow isolation and control of fuselage modes of vibration independent of corresponding wing vibration modes, thereby alleviating one of the common sources of wing flutter. That is, the system enables isolation of the pitch modes of the fuselage from the torsion modes of the wing, and thereby helps to alleviate wing flutter and vibratory modes. This can allow aircraft weight to be reduced because flutter loads are reduced. This system also helps to reduce gust load effects on the fuselage, and can also help enable the application of software that manipulates load distribution between the wing and fuselage.

Although various embodiments have been shown and described, the present disclosure is not so limited and will be understood to include all such modifications and variations are would be apparent to one skilled in the art.

What is claimed is:

1. An aircraft, comprising:
   a fuselage;
   a wing having a main spar assembly; and
   an active suspension system, interconnecting the fuselage and the wing, the active suspension system including four groups of actuators, positioned at one of four corners of the main spar assembly, each actuator group comprising three actuators oriented at substantially orthogonal angles to each other.

2. The aircraft of claim 1, wherein the active suspension system receives inputs and adjusts a position of the wing to account for the inputs.

3. The aircraft of claim 1, wherein the active suspension system is configured to selectively adjust a relative position of the wing and fuselage in response to dynamic loads upon the wing and/or the fuselage.

4. The aircraft of claim 3, wherein the active suspension system further comprises:
   a plurality of sensors, attached to at least one of the wing and the fuselage, each sensor configured to produce a sensor signal indicating a motion and/or stress condition at a location of the respective sensor; and
   a controller, configured to receive and analyze signals from the plurality of sensors, and to control the plurality of actuators in response to the sensor signals, to dynamically adjust the position of the wing in response to forces from and/or motion of the wing.

5. The aircraft of claim 4, wherein the sensors include at least one of stress sensors, accelerometers, proximity sensors, position sensors and orientation sensors.

6. The aircraft of claim 1, wherein the active suspension system can be manipulated to flare the wing for takeoff and/or landing of the aircraft.

7. The aircraft of claim 1, wherein the wing is disposed substantially below the fuselage.

8. The aircraft of claim 1, further comprising a flexible wing-to-body fairing, enclosing the active suspension system.

9. A method of adapting an aircraft to attenuate forces between a wing and a fuselage thereof, comprising:
   providing a plurality of sensors upon the aircraft, configured for sensing motion and/or mechanical stress of the wing and/or the fuselage and producing signals indicative thereof; and
   providing four groups of active suspension elements interconnecting the wing and the fuselage, each group including three actuators oriented at substantially orthogonal angles to each other, the active suspension elements being configured to move at least in response to the signals to adjust a position of the wing with respect to the fuselage.

10. A method in accordance with claim 9, further comprising providing a controller, interconnected between the plurality of sensors and the active suspension elements, the controller configured to receive signals from the sensors and provide output signals to control the active suspension elements to dynamically adjust the position of the wing in response to forces from and/or motion of the wing.

11. A method in accordance with claim 10, further comprising interconnecting the controller with a flight control system, flight parameters, and pilot or autopilot input, and to provide output based on the actively suspended wing model, to dynamically control the active suspension elements.

12. A method in accordance with claim 10, further comprising providing the controller with programming code including an actively suspended wing model, configured to dynamically compute adjustments to the position of the wing in response to forces from and/or motion of the wing with respect to the fuselage.

13. A method in accordance with claim 10, further comprising programming the controller to actuate the suspension elements to adjust a pitch of the wing in connection with takeoff or landing of the aircraft.

14. A method in accordance with claim 9, wherein providing the four groups of active suspension elements comprises attaching each group of active suspension elements to one of four corners of a main spar assembly of the wing of the aircraft.

15. A method in accordance with claim 9, further comprising enclosing the active suspension elements within a flexible wing-to-body fairing.

* * * * *